(12) United States Patent
Bodnar et al.

(10) Patent No.: US 10,514,743 B2
(45) Date of Patent: Dec. 24, 2019

(54) SOFTWARE CONTROLLED POWER SUPPLY

(71) Applicant: Velvetwire LLC, Santa Cruz, CA (US)

(72) Inventors: Eric O. Bodnar, San Francisco, CA (US); Christopher R. Kilgus, Felton, CA (US); Jennifer J. Lee, Santa Cruz, CA (US)

(73) Assignee: VELVETWIRE LLC, Santa Cruz, CA (US)

( * ) Notice: Subject to any disclaimer, the term of this patent is extended or adjusted under 35 U.S.C. 154(b) by 376 days.

(21) Appl. No.: 14/526,543

(22) Filed: Oct. 29, 2014

(65) Prior Publication Data

US 2015/0212566 A1 Jul. 30, 2015

Related U.S. Application Data

(60) Provisional application No. 61/897,183, filed on Oct. 29, 2013.

(51) Int. Cl.
*G06F 1/32* (2019.01)
*G06F 1/26* (2006.01)
(Continued)

(52) U.S. Cl.
CPC .......... *G06F 1/3206* (2013.01); *G06F 1/3234* (2013.01); *H02J 9/005* (2013.01);
(Continued)

(58) Field of Classification Search
CPC ........ H02J 7/0008; H02J 7/0022; H02J 9/005; H02J 17/00; H02J 7/045; H02J 7/0054;
(Continued)

(56) References Cited

U.S. PATENT DOCUMENTS 4,074,182 A * 2/1978 Weischedel ............. G05F 1/573
307/82
5,121,314 A * 6/1992 Cathell ............... H02M 3/3376
363/17
(Continued)

FOREIGN PATENT DOCUMENTS

| EP | 1533881 A2 | 5/2005 |
|---|---|---|
| EP | 2602721 A2 | 6/2013 |
| WO | 2013147489 A1 | 10/2013 |

OTHER PUBLICATIONS

EP 14190947.3, European Examination Report, dated Nov. 30, 2016, 5 pages.
(Continued)

*Primary Examiner* — Phil K Nguyen
(74) *Attorney, Agent, or Firm* — HIPLegal LLP; Judith Szepesi

(57) ABSTRACT

A method of controlling a power supply using software comprises setting a nominal output level through a waveform controlled by a micro-controller. The method identifies when a device is fully charged, and moves to a keep-alive mode, in which the output level is decreased below the nominal output level when the device is fully charged. The method further provides a failsafe to move the system to the keep-alive mode when the micro-controller is halted, crashed, in an error state.

22 Claims, 9 Drawing Sheets

(51) Int. Cl.
  *G06F 1/3206* (2019.01)
  *H02M 3/335* (2006.01)
  *G06F 1/3234* (2019.01)
  *H02J 9/00* (2006.01)
  *H02M 1/00* (2006.01)
  *H02J 7/00* (2006.01)

(52) U.S. Cl.
  CPC ......... *H02M 3/33515* (2013.01); *H02J 7/008* (2013.01); *H02J 7/0052* (2013.01); *H02J 2007/0059* (2013.01); *H02M 2001/0032* (2013.01); *Y02B 70/16* (2013.01)

(58) Field of Classification Search
  CPC .............................. H02J 7/0081; H02J 7/008; G06F 1/32; G06F 1/26
  See application file for complete search history.

(56) References Cited

U.S. PATENT DOCUMENTS

| | | | |
|---|---|---|---|
| 5,523,671 A | 6/1996 | Stewart | |
| 5,859,524 A * | 1/1999 | Ettes | H02J 7/0068 320/114 |
| 2002/0070709 A1 | 6/2002 | Small et al. | |
| 2005/0162138 A1* | 7/2005 | Kernahan | H03K 19/0963 323/234 |
| 2009/0206841 A1* | 8/2009 | Weng | G01R 31/3658 324/426 |
| 2010/0085022 A1 | 4/2010 | Shimizu et al. | |
| 2011/0075454 A1* | 3/2011 | Jones | H02M 1/14 363/67 |
| 2014/0217998 A1 | 8/2014 | Krueger | |
| 2014/0269136 A1 | 9/2014 | Kamiya et al. | |
| 2014/0346874 A1 | 11/2014 | Fang et al. | |
| 2015/0015191 A1 | 1/2015 | Kim | |
| 2015/0028824 A1 | 1/2015 | Tse et al. | |

OTHER PUBLICATIONS

EP 14190947.3, European Search Opinion, dated Dec. 17, 2015, 8 pages.
EP 14190947.3, Extended European Search Report, dated Dec. 17, 2015, 4 pages.
EP14190947.3, Partial European Search Report, dated Sep. 14, 2015, 6 pages.

* cited by examiner

1. Period of stability and maximum power consumption
2. Period of declining power consumption
3. Period of stability, gradually approaching minimum consumption

SOFTWARE CONTROLLED POWER SUPPLY

RELATED APPLICATION

The present application claims priority to U.S. Provisional Patent Application No. 61/897,183, filed Oct. 29, 2013 and incorporates the provisional application in its entirety.

FIELD

The present invention relates to power supplies, and more particularly to a software-controlled power supply.

BACKGROUND

Pulse frequency modulated power supplies are common for producing the fixed voltage DC output required to charge battery powered mobile devices from a variety of AC inputs. While smaller, more flexible, and more efficient than simple transformer power supplies, pulse frequency modulated power supplies are still active mechanisms that consume power. With the growth of mobile devices, now numbering in the billions, cumulative standby power consumption by charging power supplies is becoming a problem. The problem being that power supplies that remain attached to a power source consume standby power in order to remain active and achieve regulated output voltage.

Furthermore, power supplies that remain attached to both a power source and to a charged device consume additional standby power because the coupled device continues to draw trickle power, even when fully charged. This wasted power is costly to both individual device owners and to society as a whole.

FIG. 1 illustrates a prior art fixed voltage power supply using DC/DC pulse frequency modulation. The high voltage DC current, which can be created by rectifying high voltage AC current (not shown), powers charge pump oscillator (101) operating at a high frequency (typically 50-150 kHz).

The charge pump oscillator (101) controls the gate of MOSFET (102), which in turn, induces a high frequency, high voltage AC signal from the DC supply current through transformer (103). Transformer (103) outputs a magnetically isolated high frequency, low voltage AC signal, rectified by diode (104). Rectifier (104) feeds bulk capacitor (105), which removes ripple from the low voltage rectified signal, producing a DC output.

The Zener diode network (106) allows current to flow through the LED of optical isolator (107) when the output voltage exceeds the Zener threshold. Optical isolator (107), when illuminated, disables the output of the AC waveform from charge pump oscillator (101) to MOSFET (102) and through transformer (103). With charge pump oscillator (101) disabled, output voltage will begin to fall until current no longer flows through Zener diode network (106) and optical isolator (107), allowing charge pump oscillator (101) to become active again.

The resulting pulse frequency modulated waveform (108) generated by charge pump oscillator (101) and feedback network (104-107) is enabled whenever the regulated output voltage is below the regulated threshold and disabled whenever the regulated output voltage is above the regulated threshold. The result is a fixed DC voltage output from an arbitrary high voltage AC input.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

The present invention is a power supply for charging battery powered mobile devices from a variety of alternating current (AC) inputs. The power supply has the ability to disengage power to rechargeable devices that remain coupled but have completed charging, eliminating trickle power draw. The power supply in one embodiment further can modally regulate power output such that when no device is coupled to the power supply the standby power consumed by the power supply itself is reduced. This is accomplished by using a software-controlled regulator, with a micro-controller, or microprocessor.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
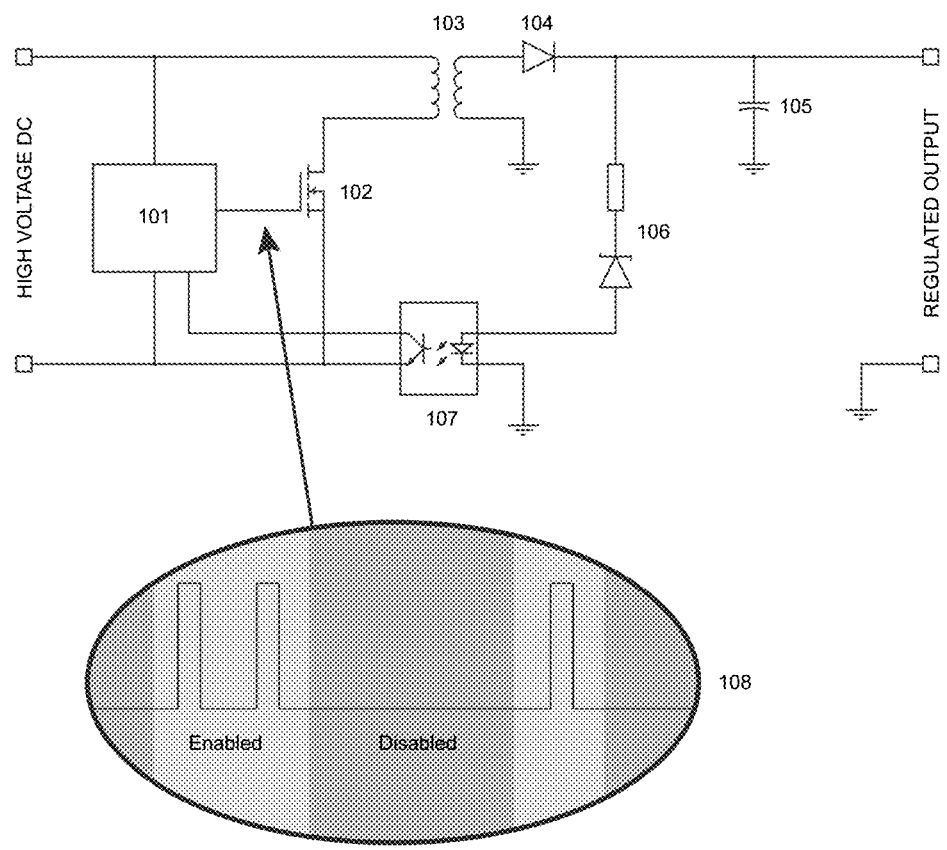
FIG. 1 is a prior art pulse frequency modulated power supply.
Figure 2:
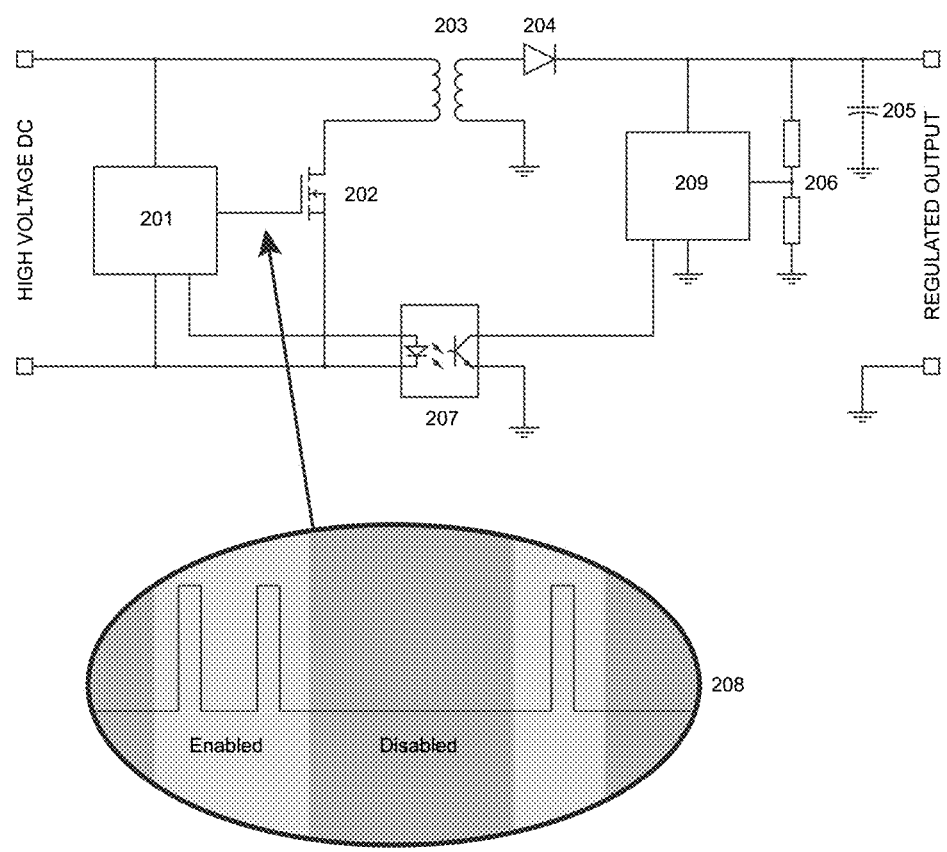
FIG. 2 is a block diagram of a power supply in accordance with one embodiment of the present invention.

FIG. 2 is a block diagram of a simplified diagram of one embodiment of embodiment of a software-controlled regulator. The fixed Zener regulator of FIG. 1 is replaced with a software-controlled regulator using a micro-controller 209. The reference voltage is derived from the output voltage by a divider network 206, which is then fed into the micro-controller 209. The micro-controller 209 monitors this reference voltage using either analog to digital conversion or an analog comparator. Many modern embedded micro-controllers include one or both of these capabilities. In one embodiment, the micro-controller used is the ATTiny13A by ATMEL CORPORATION™.

In one embodiment, the reference voltage from voltage divider network (206) is input to micro-controller (209), which compares it against a target value, and produces a Boolean enable state. In one embodiment, the enable state is true when the voltage is below the target value, and false when the voltage is above the target value.

Micro-controller (209) outputs the Boolean enable state, generated by examining the reference voltage from divider network (206), to optical isolator (207). In one embodiment, optical isolator (207) is "on" when the enable state is true, and "off" when the state is false. This produces the enabled and disabled periods shown in waveform (208).

The micro-controller 209 uses the voltage reference to generate a digital enable signal, which is fed back to charge pump oscillator (201). The charge pump oscillator (201) is enabled whenever software in the micro-controller 209 determines that the voltage is too low and disabled when software determines that it is too high. Because the feedback is software controlled, it can be set to any arbitrary voltage. In one embodiment, this enables the system to act as a charger to various devices, including devices that require a variety of voltage and/or current profiles.

Because standby power consumption is a product of both voltage and current ($P=V*I$), the system can leverage software controlled voltage to reduce standby consumption. When the "nominal" voltage, the voltage required by a coupled rechargeable device, is no longer required, the software can downshift the voltage to a significantly lower "keep-alive" level. This level is sufficient to keep the micro-controller alive while considerably reducing standby power consumption. Software voltage control can also remove the ripples in the DC output and provide a completely stable output voltage for charging.

Those skilled in the art will realize that the tight regulation and filtration mechanisms, required to make a fixed Zener feedback mechanism operate successfully, are not required for the micro-controller implementation. Because the feedback signal is digital, it is either on or off and can be timed and aligned to satisfy the charge pump oscillator of the DC/DC converter mechanism.

Those skilled in the art will also realize that, in one embodiment, the output voltage can be directly fed to the micro-controller without the need for a voltage divider network. Additionally, other reference implementations, including those that involve Zener diodes or fixed voltage references, can be substituted for or enhance the voltage divider.

In one embodiment, micro-controller 209 controls an indication mechanism (not shown), which shows the status of the system. In one embodiment, the indication mechanism is visual, such as an LED (light emitting diode). In one embodiment, the LED may be a multi-colored LED, or a plurality of separate LEDs that together output a spectrum of colors, with different colors indicating different statuses. In one embodiment, indication mechanism is auditory, such as a speaker or piezoelectric element. In one embodiment, the indicator is data transmitted to an external device or application. In one embodiment the indication mechanism shows the status of the coupled device, such as charging or charged. In one embodiment the indication mechanism shows the status of the system, such as over temperature or over current. In one embodiment, the indication mechanism provides a plurality of metrics and statuses in graphical form within an external application.

The software-controlled power supply has several advantages. Regulation circuitry is simpler but can be made more precise by software. The feedback to the DC/DC voltage converter is digital, eliminating the ripple created by partial on and partial off states. Using software-controlled power supply also enables the reduction of standby power by lowering the regulated voltage from nominal levels to keep-alive levels when a device is not being charged. Additionally, the same power supply can be programmed to different nominal power output levels, or even multiple power output levels, depending on application.

In one embodiment, the coupled device being charged may also connect to the charger system via a wireless connection, such as Bluetooth, or via a wired connection, such as USB. The system can in one embodiment, read data from the device being charged, such as device specification, model and status, and adjust the power supply output levels, in response. In one embodiment, the system adjusts maximum current output based on data communicated over the connection. In one embodiment, the system adjusts regulated voltage output based on data communicated over the connection. In one embodiment, the system adjusts maximum charge time based on data communicated over the connection.

Figure 3:
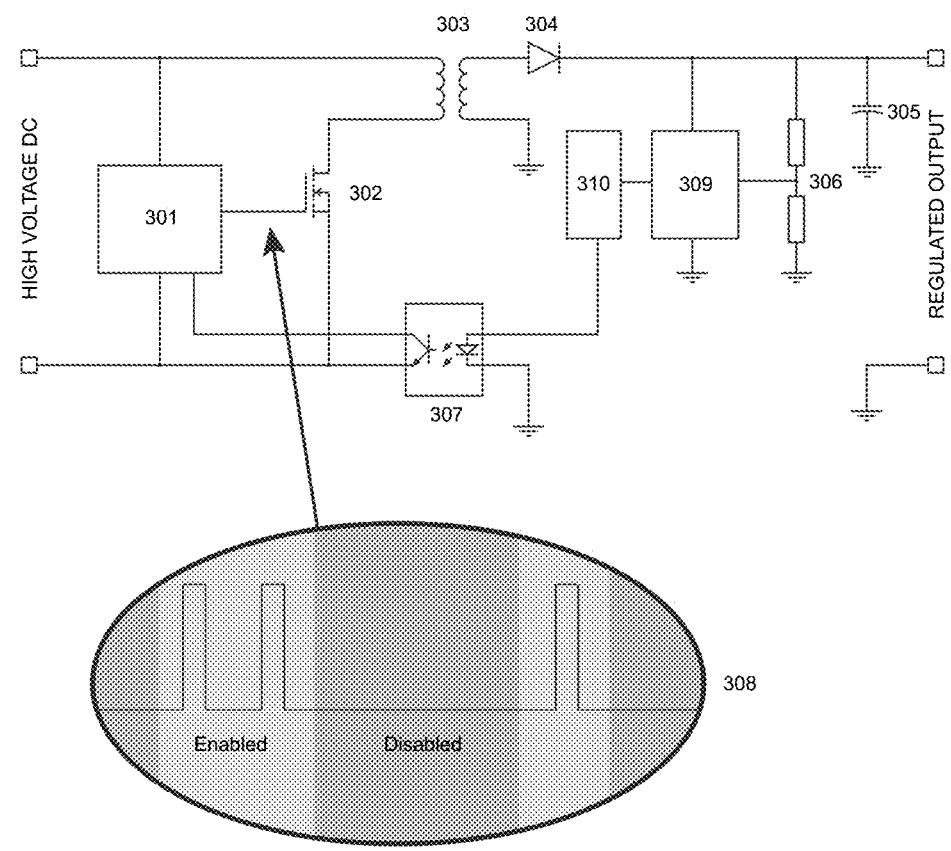
FIG. 3 is a block diagram of a software-controlled power supply including a standby safety mechanism, in accordance with one embodiment of the invention.

FIG. 3 illustrates one embodiment of a software-controlled power supply that provides a practical implementation to address software-failure issues. Because the power supply is controlled by a micro-controller, the system addresses what occurs if the micro-controller fails, crashes, or needs to be taken offline for reprogramming or other reasons. A crashed, frozen, or halted micro-controller will no longer provide regulation feedback and, thus, without a control mechanism can lead to an over-voltage or under-voltage situation, potentially damaging itself or any coupled device. This embodiment of the power supply provides an analog backstop regulation, in case the software crashes.

FIG. 3 illustrates one embodiment of the software controlled power supply with an analog backstop acting as a standby safety mechanism.

The digital enable state generated by micro-controller (309) by observing the reference voltage produced by divider network (306) is no longer directly coupled to optical isolator (307), as in FIG. 2, but connected through standby safety mechanism (310) instead.

The standby safety mechanism (310) protects the regulated output by overriding the digital enable state from micro-controller (309) if the regulated output voltage exceeds a fixed upper safety limit.

The standby safety mechanism (310) ensures that the regulated output does not fall to zero by overriding the digital disable state from the micro-controller (309) if the output voltage falls below a fixed lower keep-alive limit.

The standby safety mechanism 310 provides two overrides, in one embodiment. The digital feedback from the micro-controller is allowed to pass through to the feedback circuitry if, and only if, the regulated output is below a safe upper limit, and the regulated output is above a minimum keep-alive limit. The standby safety mechanism allows for arbitrary software controlled nominal voltage regulation between and upper safety limit and lower keep-alive limit by passing the digital feedback from the micro-controller through the optical feedback circuitry.

Those skilled in the art will realize that, in addition to protection against software failure, the standby safety mechanism can be designed to allow the micro-controller to "lock" the regulation to either the upper safety limit or the lower keep-alive limit. This also enables the micro-controller to go to sleep, thereby disabling software regulation, with the logic state set to keep-alive during sleep. This is advantageous for additional standby power savings. Disabling software regulation and defaulting the logic state (or tristate) to the upper safety limit can also be used when the micro-controller is offline for in-circuit software programming.

Figure 4:
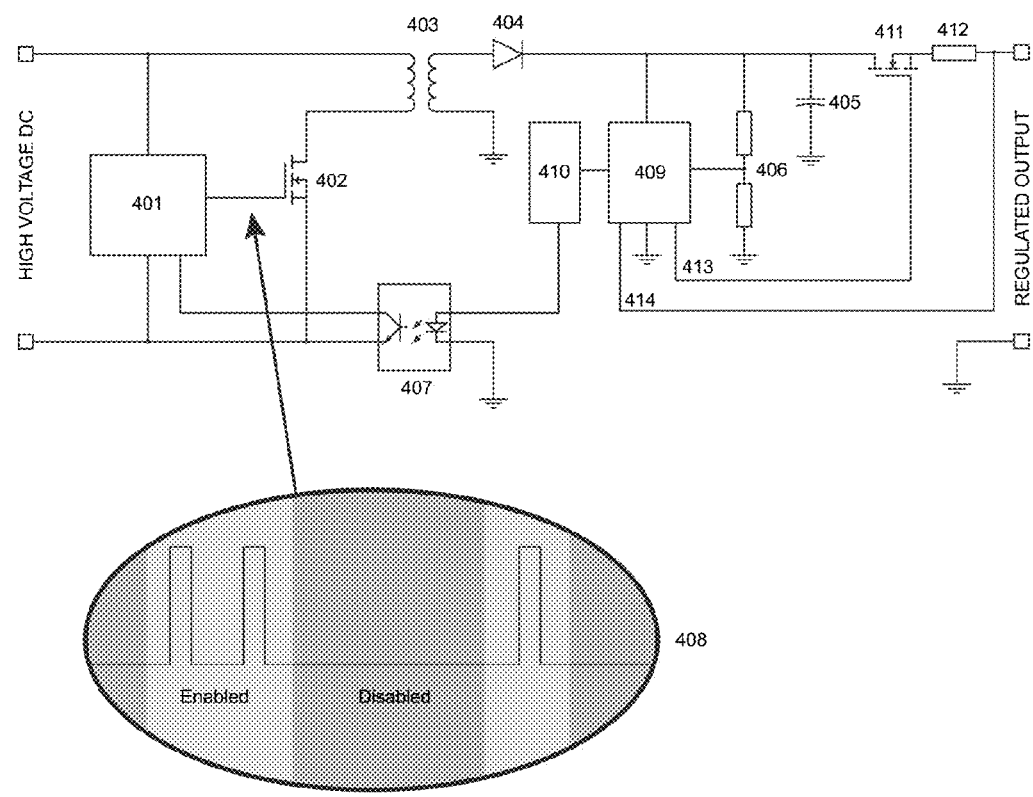
FIG. 4 is a block diagram of a software controlled power supply including a standby safety mechanism and an output switch, in accordance with one embodiment of the invention.

FIG. 4 illustrates one embodiment of a software controlled power supply with a standby safety mechanism and load attachment detector. The regulated output power controlled by micro-controller (409) and standby safety mechanism (410) is fed through MOSFET switch (411) and through shunt (412). The gate of MOSFET switch (411) is enabled and disabled by micro-controller (409) through signal (413) in order to switch on and off the output of regulated power to a coupled device. Voltage on the output side of shunt (412) is fed back to micro-controller (409) via feedback signal (414) in order to provide current output measurement.

When MOSFET switch (411) is disabled using signal (413), voltage on the output side of shunt (412) can be pulled up with a high-impedance input by the micro-controller (409) on feedback signal (414) and used to detect the presence of coupled devices at the output port. In one embodiment, voltage feedback on the output is pulled up by a resistor internal to the micro-controller. In one embodiment, voltage feedback on the output is pulled up by an external resistor.

Rather than tie the regulated output to the connection between the power supply and the charging device, an output switch controlled by digital logic in the micro-controller connects and disconnects power to the coupled device. In one embodiment, the output switch is a MOSFET transistor.

A current sensing mechanism provides feedback to the micro-controller to determine the amount of power flowing to the coupled device. Software in the micro-controller monitors power flowing to the coupled device and, once it has determined that the device is fully charged, disconnects it by disabling the switch. In one embodiment, the current sensing mechanism is a resistive shunt.

Additionally, the voltage feedback from the output stage of the current sensing mechanism to the micro-controller can be used as a device detection mechanism when the output switch is disabled. By adding a pull-up resistor (or using an internal micro-controller pull-up) and monitoring the voltage drop on the output stage, a simple device detection mechanism can be realized.

Those skilled in the art will realize that using a shunt to provide current (and thus power) feedback is an implementation choice. In one embodiment, the current feedback is derived from the voltage drop across the output switch. Power delivered to the coupled device can also be derived from the digital output signal supplied by the micro-controller. The ratio of enabled to disabled states over a fixed period of time is proportional to the amount of power being delivered.

Of course, because of the presence of a micro-controller, those skilled in the art will see that a variety of alternate or additional device detection mechanisms are made available, including but not limited to optical sensors, mechanical switches and capacitive discharge circuits.

The software controlled power supply with a standby safety mechanism and load attachment detector has numerous advantages. Device attachment and detachment can be detected. The power flow to the coupled device can be monitored, and disabled, once it is determined that the device is fully charged or no longer requires charging. This eliminates trickle loss. Once power is disabled to the coupled device, nominal output can be reduced to a keep-alive level, and the micro-controller can be mostly disabled, minimizing standby power consumption.

Figure 5:
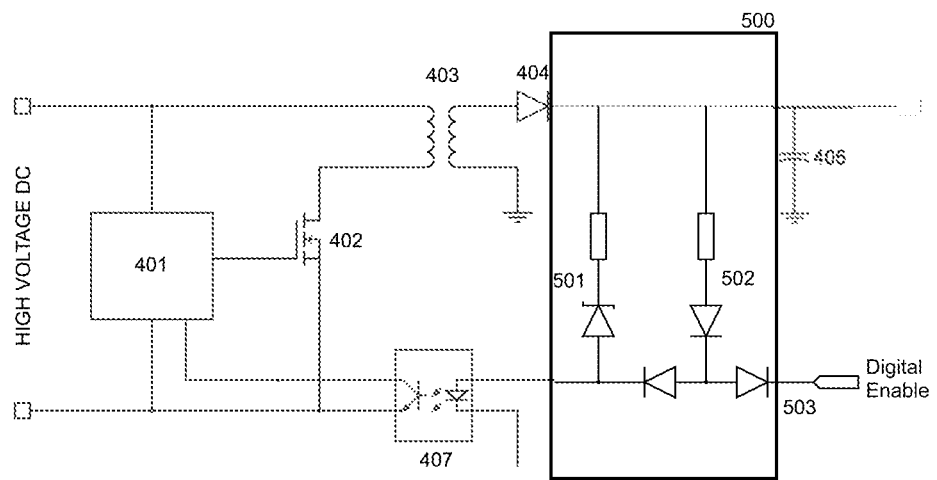
FIG. 5 is a block diagram of one embodiment of the standby safety mechanism.

FIG. 5 is one embodiment of the standby safety mechanism that overrides the digital enable signal from the micro-controller. In one embodiment, this standby safety mechanism is used in the circuits described above, in FIG. 3 and FIG. 4. Zener network (501) becomes active when the output voltage exceeds the Zener threshold, forcing the LED in the optical isolator to become active. The Zener threshold is set for the upper safety limit, in one embodiment.

Diode network (502) remains inactive as long as the digital enable signal (503) from the micro-controller is at logic high or in a high-impedance state, leaving Zener network (501) as the only method of regulation.

Diode network (502) becomes active when the digital enable signal (503) from the micro-controller is at logic low, and the output voltage exceeds the keep-alive threshold, determined by the voltage drop across diode network (502) and the optical isolator.

A digital waveform supplied on digital enable signal (503) from the micro-controller will pass through to the LED on the optical isolator and can be used to regulate output voltage at any level between the minimum enforced by diode network (502) and the maximum enforced by Zener network (501).

One embodiment of the standby safety mechanism emphasizes simplicity over accuracy and is ideal for applications where precise regulation is only required for the nominal output level. However, those skilled in the art will note that a variety of alternative embodiments of the standby safety mechanism can be realized by substituting or adding to the recommended components. For instance, the diode drop mechanism in network (502) can be replaced by a Zener network. Also, fixed voltage references, such as the Texas Instruments LM431, can be used in place of diodes, if more precision is required for the minimum keep-alive level or maximum safe limit.

The standby safety mechanism defaults to the keep-alive limit whenever the digital logic input is pulled low. It defaults to the upper safety limit whenever the digital logic input is set high. Additionally, it remains in the upper safety limit when the digital logic input is set to a high-impedance state, such as during micro-controller programming.

The standby safety network provides the ability to set a preferred DC output level at any level between a keep-alive minimum and a safe upper maximum, through a digitally supplied waveform. It also allows a micro-controller to assert a digital logic level and go to sleep, locking regulation at one of the two enforced limits. The most practical use of the latter feature is to lock regulation at the lower keep-alive limit and go to sleep for maximum power savings. Finally, the standby safety network allows power to be supplied to the micro-controller by the power supply while the micro-controller is in a passive or halted state, such as during debug or reprogramming.

If a digital square wave signal is provided by the micro-controller, this signal will pass through the standby safety mechanism to the feedback circuitry. This allows for an arbitrary software controlled nominal level anywhere between the upper safety limit and the lower keep-alive limit.

The logic table enforced by the standby safety mechanism is as follows:

| Digital Logic | Safety Mode | Output |
| --- | --- | --- |
| Passive (high impedance) | Blocked | Upper safety limit |
| Enable (low) | Blocked | Upper safety limit |

| Digital Logic | Safety Mode | Output |
| --- | --- | --- |
| Disable (high) | Blocked | Lower keep-alive limit |
| Waveform | Pass through | Software controlled |

In one embodiment of the standby safety mechanism provides numerous advantages. It enables software to control the nominal regulation level through a waveform. Furthermore, software can force the mechanism into a keep-alive mode and most of the micro-controller can go to sleep, saving power. Furthermore, the system ensures that software crashes or bugs cannot cause over voltage failure conditions or under voltage brown-outs. Additionally, the system enables the micro-controller to remain powered by the power supply while halted or during programming.

Figure 6:
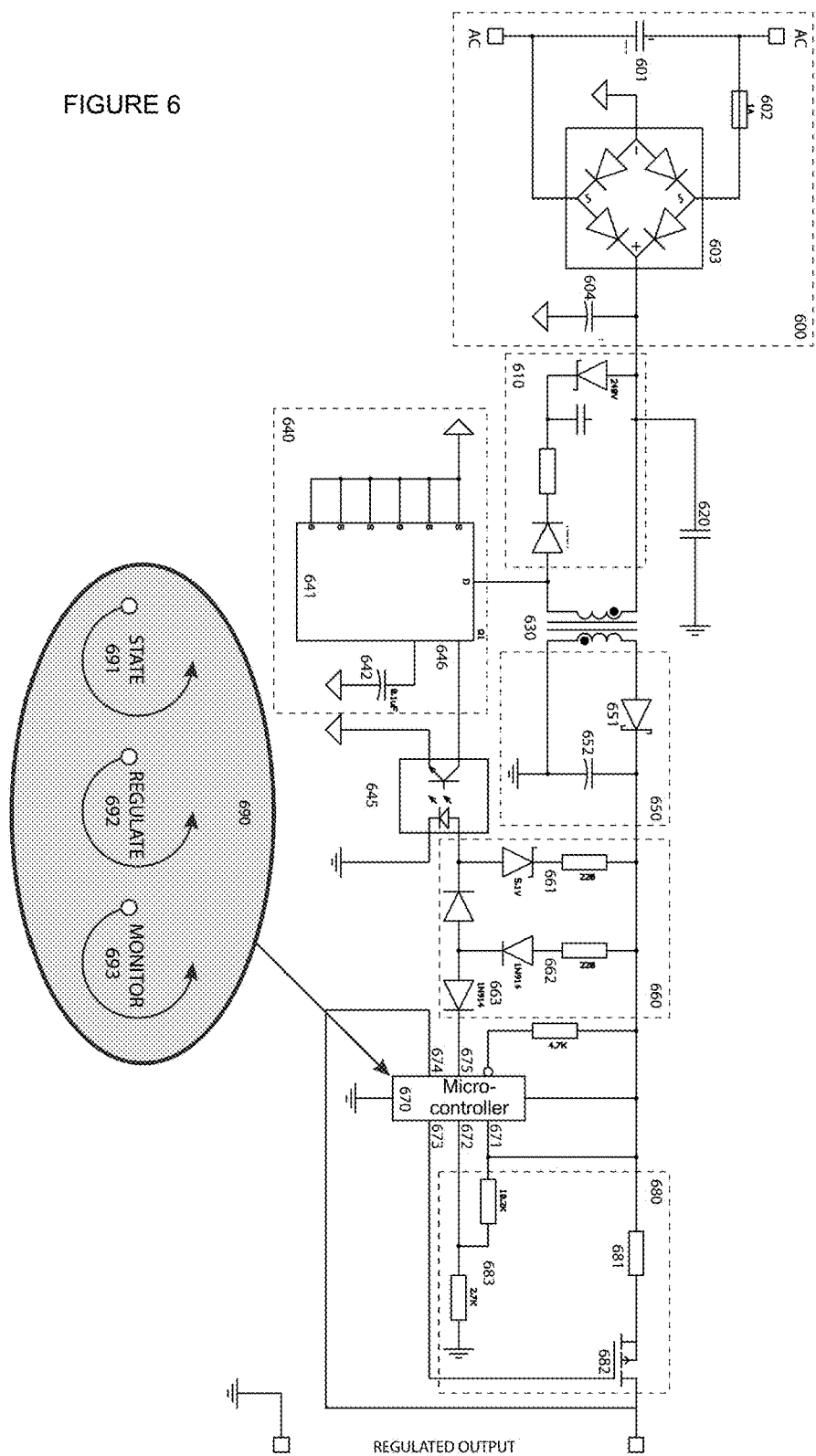
FIG. 6 is a circuit diagram of one embodiment of the system.

FIG. 6 is a circuit diagram of one embodiment of the system, with which the present invention may be used. FIG. 6 includes additional blocks outside the scope of this invention to provide an example of a practical implementation.

The system is coupled to alternating current (AC) power, such as the power provided by a wall outlet. The AC power is rectified by rectifier block (600) using diode bridge (603) and bulk capacitor (604). In one embodiment, fuse (602) is included for safety. Capacitor (601) is included to minimize emissions from the charge pump oscillator. The output from rectifier block (600) is high voltage DC.

Charge pump oscillator (640) is implemented, in one embodiment, using an integrated oscillator controller and MOSFET (641) available from a variety of vendors. In one embodiment, the TinySwitch from POWER INTEGRATIONS™ is used. The oscillator (640) is powered by bypass capacitor (642). Optical isolator (645) provides electrically isolated enable signal (646) to integrated oscillator controller (641), which, in turn, powers transformer (630) through its integrated MOSFET.

Snubber network (610) is included for illustrative purposes only but would be used in a practical implementation to protect the MOSFET in integrated oscillator controller (641) from over-voltage spikes generated by excess energy in transformer (630) during switching cycles. Those skilled in the art will recognize that there are many suitable variations of a snubber network and that the values of the components within the snubber network should be tuned to match the characteristics of the transformer and other components.

Safety capacitor (620) is included for illustrative purposes only. It is used to provide a safe ground reference for the isolated portion of the circuit.

Rectifier block (650), consisting of Schottky diode (651) and bulk capacitor (652), converts the high frequency, isolated AC output of transformer (630) into isolated DC.

Standby safety block (660), consisting of Zener network (661) and diode network (662), implements the standby safety mechanism discussed above. Signal diode (663) provides a pathway for micro-controller (670) to send an enable signal waveform via output pin (675) through standby safety block (660) to optical isolator 645, thereby setting the regulated output voltage.

Output control block (680) provides regulated output voltage feedback to micro-controller (670) on comparator input pin (672) via voltage divider network (683). Those skilled in the art will recognize that the values in divider network (683) must be tuned to provide a feedback voltage proportional to the output voltage, such that the feedback voltage on input pin (672) are within the limits of the micro-controller (670).

Output control block (680) provides current feedback to micro-controller (670) via positive input pin (671), which provides voltage before resistive shunt (681), and negative input pin (674), which provides voltage after output gate switch (682). The voltage drop between pins (671) and (674) is proportional to the current flowing through shunt (681) to the coupled charging device.

Output control block (680) includes output gate MOSFET switch (682), which allows micro-controller (670) to enable or disable current flow to the coupled device via output signal (673). When signal (673) is disabled and no current is allowed to flow through gate (682), input pin (674) can be combined with an internal pull-up within micro-controller (670) to create an attachment and detachment detection mechanism.

Micro-controller (670) utilizes system software (690) to provide output voltage regulation and state. The logics described, in one embodiment, are software running on micro-controller (670). Regulate logic (692) controls output on enable pin (675) by monitoring reference voltage at pin (672) in combination with feedback from monitor logic (693). Monitor logic (693) monitors current flow through shunt (681) via pins (671) and (674) and calculates the charge state of the coupled device as well as other factors, such as maximum safe current and temperature, and reports results back to regulate logic (692) and state logic (691). State logic (691) determines the state of the system and controls output through gate (682) via signal (673).

The micro-controller, in one embodiment, uses a state machine-based switching mechanism. The state machine switches the power output among the states of the power supply. In one embodiment, at a minimum the power supply has two states, a keep-alive level with power output to the coupled device disabled (standby), and a nominal level with power output to the coupled device enabled (charging). In one embodiment, when no device is connected or the connected device is fully charged, the micro-controller is at a keep-alive level.

In one embodiment, the micro-controller includes software that provides a regulator feedback loop for providing digital enable signal to the standby protection mechanism. The micro-controller, in one embodiment, further includes a monitor feedback loop to measure power flow to the coupled device.

In one embodiment, each of these components (state machine, regulator feedback loop, monitor feedback loop) is implemented as an independent thread in the micro-controller. Alternatively, each of feedback loops can be implemented as hardware timer events, and the state machine as an endless main loop. Those skilled in the art will recognize that all three software components also can be implemented as a single continuous running loop.

The software controlled charger has numerous benefits. It regulates the power very precisely. It also provides current fold-back when the load attempts to draw excessive current from the supply. Fold-back reduces both the output voltage and current to below the normal operating limits. In one embodiment, the current limit that initiates fold-back is a variable value maintained by the micro-controller.

In one embodiment, the system also provides temperature triggered fold-back, reducing the voltage and current when the system approaches the temperature limit. In one embodiment, the temperature level which initiates fold-back is a variable value maintained by the micro-controller. In one embodiment, temperature fold-back causes the algorithm in the microprocessor to incrementally back off the current over a time period. Because the micro-controller can precisely control current levels, and there is no need for hardware to limit current strictly. This enables the system to slowly reduce the current, until it reaches an acceptable temperature. It can then iteratively increase the current, until it stabilizes at maximum temperature limit. In one embodiment, above an upper threshold, the system may lock. This ensures that, unlike some existing chargers which have an overheating problem, this charging system will not overheat.

In one embodiment, the micro-controller may include a temperature sensor. In one embodiment, the ambient temperature may be used to change the set point for the current limit, since the current limit is controlled by software, and thus fully adjustable. This means that the system can adjust based on environmental conditions, and exhibit different behaviors based on ambient conditions, for example hot or cold weather, or high or low humidity. This enables the system to adjust for current conditions, rather than having to account for the worst case scenario in the design.

Figure 7:
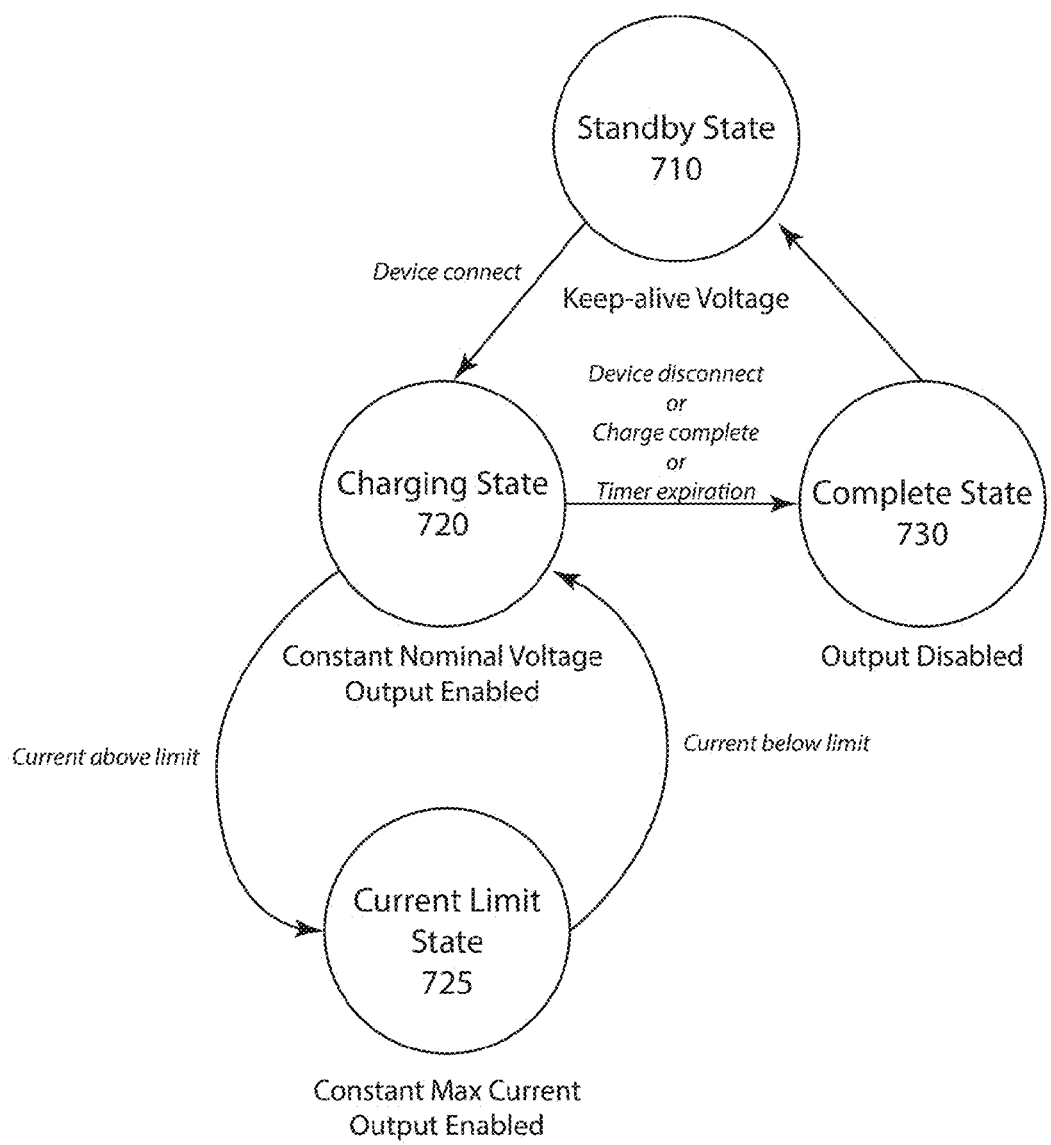
FIG. 7 is a state diagram of the micro-controller, in one embodiment.

One embodiment of the state machine used by the micro-controller is shown in FIG. 7. In the standby state 710, the system instructs the regulator feedback loop to lock to the keep-alive limit, and ensures that power flow through the power output port is disabled. In the standby state 710, the device detection circuitry is active. When a device attachment is detected, the system moves to the charge state 720. Otherwise, the system stays in the standby state 710. In one embodiment, when the system moves to the charge state, the minimum, maximum and count values tracked by the monitor are reset.

In the charge state 720, the process instructs the regulator feedback loop to regulate at nominal output, and enables power flow through power output port. In one embodiment, device detection circuitry is disabled. In the charge state 720, the monitor feedback loop is enabled to monitor power flow to the coupled device and report back the charge state. When the monitor feedback loop reports that the charge is complete, the system moves to the complete state 730. Additionally, in one embodiment, if current stops flowing through the charge port (indicating probable device disconnection), the system moves to the complete state 730. In one embodiment, when an optional running timer, which times a maximum allowed charge time, expires, the system moves to the complete state 730.

In one embodiment, if monitor feedback loop reports an over-current condition, charge state 720 temporarily switches to current limit state 725 until current falls below the limit and it can switch back to charge state 720.

In the complete state 730, the process disables power flow through the power output port. The process then transitions back to the standby state 710.

Those skilled in the art will note that the above embodiment is a minimal, exemplary implementation and that a number of practical enhancements can be added. Such enhancements include, but are not limited to, features such as providing user feedback through illumination or audible sounds, measurement output through serial or other interfaces, and additional states and timers, such as wake-up and re-charge. Further enhancements include, but are not limited to, wireless or wired communication of measurements and states.

Those skilled in the art will also recognize that several enhancements to the above implementation may be required for regulatory approval and safety. Such enhancements include but are not limited to features such as temperature monitoring and current limiting. Finally, practical additions such as device attachment and detachment detection via voltage drop, mechanical or optical switching, capacitive discharge or other methods may be utilized.

In one embodiment, a regulator feedback loop controls the enable signal to the standby protection mechanism. This control loop for the regulator feedback sets the digital enable state input to the standby safety mechanism. In one embodiment, the control loop may be cyclical or execute this process at a fixed interval. In one embodiment, the control loop may be run within charging state 720.

The control loop for the regulator feedback asserts the digital input to the standby protection mechanism in order to control the regulated voltage level in response to certain events. In one embodiment, these events are:

If the keep-alive flag is set, assert the standby input to logic low, locking voltage to keep-alive level;

else, if over-current flag is set, assert the standby input to logic low, lowering the voltage;

else, if the reference voltage supplied to the microcontroller is above the software limit, assert the standby input to logic low, lowering the voltage;

else, assert the standby input to logic high, raising the voltage.

In one embodiment, the regulator feedback loop cycles at a frequency sufficient to achieve stable nominal regulation. This frequency is likely to be in the 1 kHz-20 kHz range, depending on application.

Figure 8:
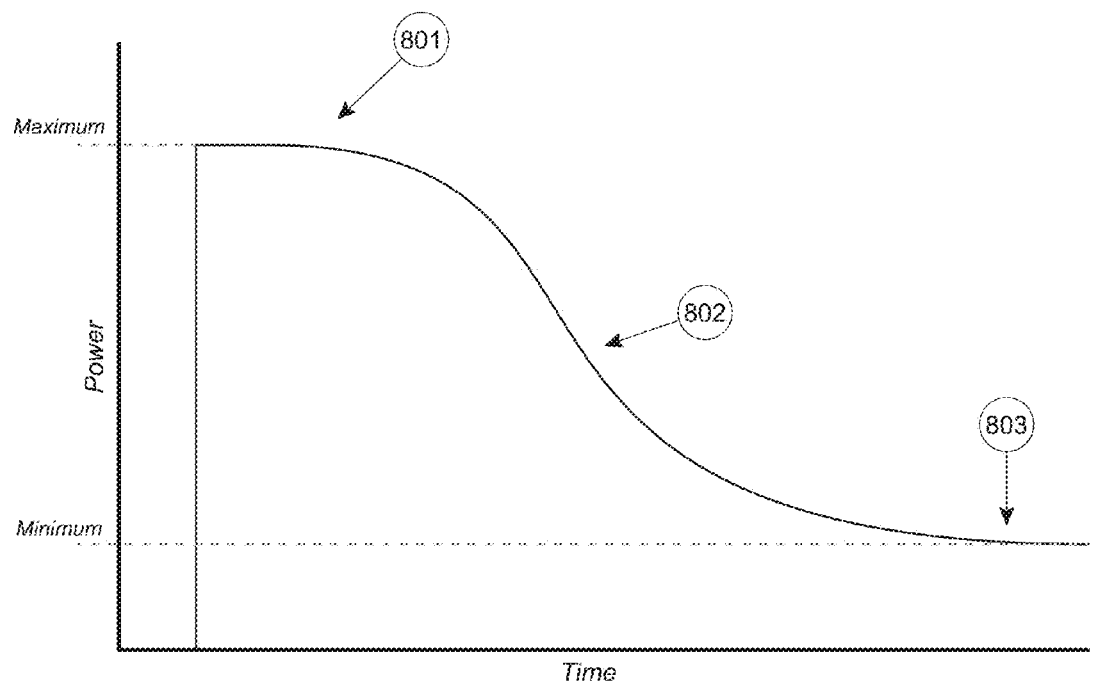
FIG. 8 is an illustration of an exemplary power consumption curve.

The monitor feedback loop, as discussed above, monitors the power flow to the coupled device and, via computations on the power flow, determines when the device is charged and no longer requires power. Typical rechargeable devices begin the charge process by consuming maximum power, usually at a steady state level. This is then followed by a gradual drop-off in power consumption as charging approaches completion. In the final phase, the slope of the drop-off in power becomes more gradual, asymptotically approaching steady state again. FIG. 8 is a graph illustrating the power consumption curve.

The monitor feedback loop may be executed cyclically or at a fixed frequency. In one embodiment, the monitor feedback loop is active when a device is connected to the charger.

The monitor feedback loop checks the current flowing through the shunt by measuring the voltage drop across it, in one embodiment. In one embodiment, the monitor feedback loop uses a ratio of enable to disable cycles generated by the regulator feedback loop over a set time interval to determine the current flow. If the current exceeds a soft current limit, the system sets the current limit flag (see regulator feedback loop) and allows nominal voltage to fall below the regulated level, limiting current flow to the coupled device.

The monitor feedback loop computes and records power flowing to the coupled device from the measured current. The below exemplary process is designed to deduce the power curve, shown in FIG. 8, based on the power flow measurements. Note that the specific details are merely exemplary, and could be altered.

If power flowing to the coupled device exceeds the recorded maximum, in one embodiment, the system sets a new maximum, sets the minimum to the maximum, and resets the time-between-minimums counter. Note that the "recorded maximum" is below the nominal maximum power, and rather a reflection of how much power the coupled device is accepting rather than how much power the charger can produce.

If power flowing to the coupled device is below the recorded minimum, in one embodiment, the system sets a new minimum, and resets the time-between-minimums counter.

If power flowing the coupled device is above the recorded minimum and at a point below the recorded maximum, the process increases the time-between-minimums counter. In one embodiment, the point below the recorded maximum is derived as half of the recorded maximum.

If the time-between-minimums counter exceeds a set limit, the system sets the charge-complete flag.

In one embodiment, the system may perform additional optional measurements and set additional flags. For example, the monitor feedback loop may also monitor whether the device is over-temperature, or whether the charging conditions otherwise exceed specification.

The above embodiment is designed to observe the drop from the initial steady state maximum, here arbitrarily set to one-half of the maximum observed power, and begin an analysis of the drop-off slope. As the slope gradually approaches steady state, the time between observed new minimums will increase and is tracked by a running counter. Once this counter has exceeded a set limit in state, the drop-off has become essentially flat or steady state. When that occurs, the device is fully charged, and the system can switch to the complete state.

Those skilled in the art will realize that the advantage of the proposed embodiment is that it functions for devices with both small and large power draws because it does not require any pre-programmed fixed values or thresholds. It also works with devices that continue to draw significant levels of standby power after charge completion as well as those that do not. It relies on shape analysis of the power curve and not on any fixed values.

Finally, those skilled in the art will note that the transition point for starting the time-between-minimums analysis is arbitrarily set to the half of the maximum observed power but that any realistic point between the maximum and anticipated minimums will suffice. Those skilled in the art will also realize that additional checks can be added to the monitor feedback loop. For instance, an over temperature check could be combined with the over current check to throttle back the current limit until the temperature stabilizes to an acceptable level.

As mentioned earlier, in one embodiment, the current measured via shunt and observed in the standby state of the current feedback loop can be replaced by an internal ratio of enable and disable states set by the regulator feedback loop over a fixed interval. This ratio is a proxy for power output. Current is a proxy for power when output voltage is fixed to a known value.

Figure 9:
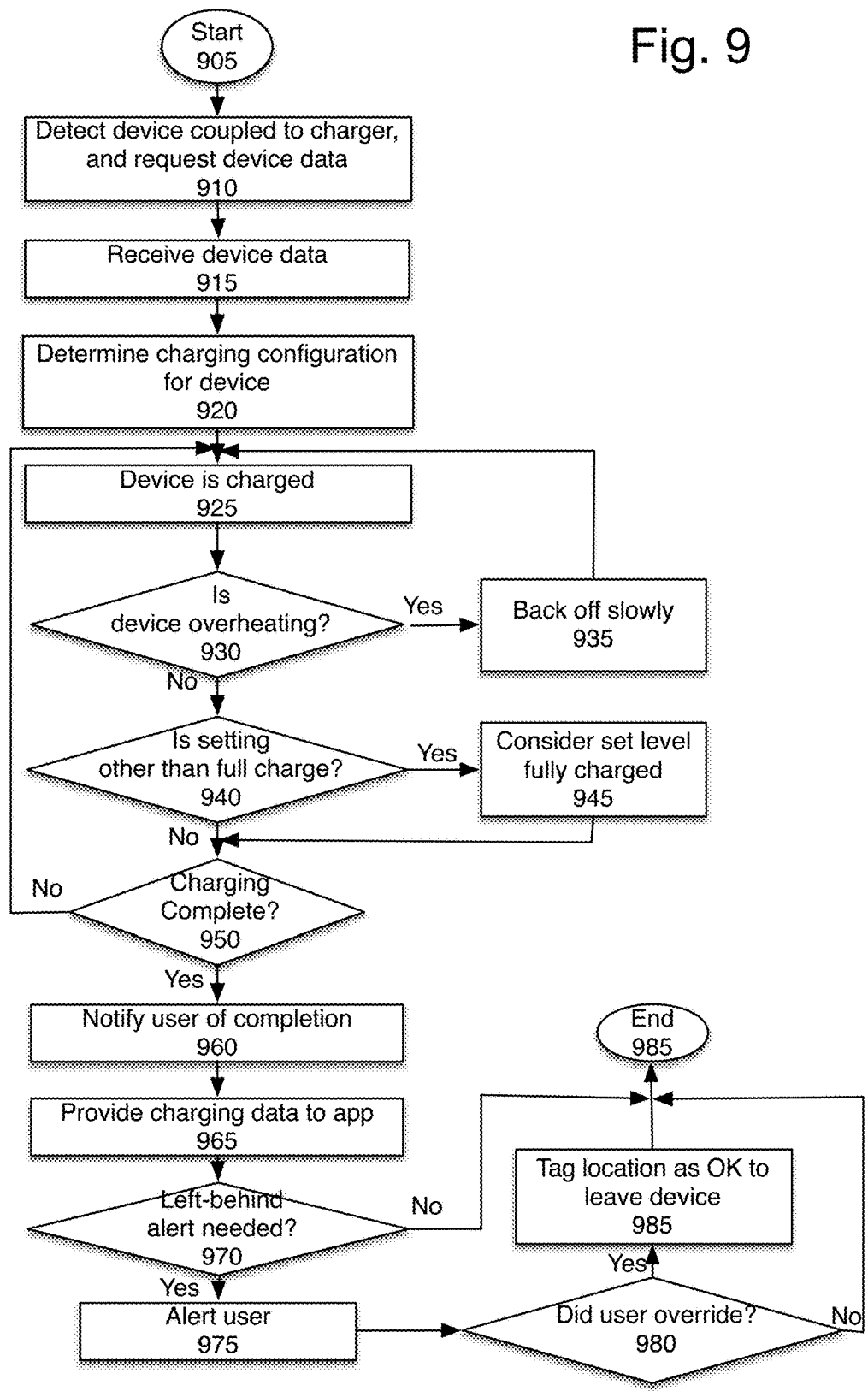
FIG. 9 is a flowchart of one embodiment of using the micro-controller for providing additional features with the charger system.

FIG. 9 is a flowchart of one embodiment of using the micro-controller for providing additional features to the charging system. In one embodiment, these features may take advantage of the processor in the device coupled to the charging system, which may be a mobile phone or other mobile computing system.

At block 910, the micro-controller detects the device coupled to the charging system. Optionally, at block 910, the charging system can request data from the coupled device. In one embodiment, data requested from the coupled device is supplemented by data stored in the charger system. In one embodiment, the data is stored in a table in a memory, and provides information about various devices (e.g. model number data supplied by the device is matched to battery capacity in a table). In one embodiment, this may be done via the USB plug. In one embodiment, though, the USB data lines are shorted together in order to conform to Battery Charging Device (BCD) specifications, and thus no data can be obtained from the USB connection. In one embodiment, data may be requested via a Bluetooth or other wireless connection.

In one embodiment, prior to receiving this information, the charger system may provide a lower power output level to the coupled device. This ensures that if the coupled device is a low power device, it is not damaged. The system then may increase the power level, once the device data is received from the coupled device, and the actual power settings are available. In one embodiment, if no data is received, the charger system assumes safe power settings for all allowed coupled devices.

At block 915, device data is received from the coupled device. In one embodiment, the device data is received via a Bluetooth or other wireless connection. In one embodiment, the data may be the brand identity, model number, device ID, or some other data that identifies the coupled device. In one embodiment, the coupled device data may be obtained from an application residing on the coupled device. The application is associated with the charger system, and interacts with the charger system without requiring user action, in one embodiment. In one embodiment, if there is an application, the charger system may not request the data directly, but rather wait for the application to send the data to it.

At block 920, when the data from the coupled device is received, the process determines the power and charging configuration for the coupled device. In one embodiment, this is done using a look-up table. In another embodiment, the power and charging configuration is provided directly by an application residing on the coupled device. The charging configuration may define the voltage and current levels used in charging the coupled device. In one embodiment, the charging configuration may define the instantaneous power level (e.g. 10 W). In yet another embodiment, the data provided by an application instructs the charging system to relinquish power output and state control to the application itself.

At block 925, the coupled device is charged, based on the available data. In one embodiment, charge status is derived through analysis of the power curve. In one embodiment, the coupled device supplies charge status to the charger system as data.

At block 930, the process determines whether the system is overheating. If so, at block 935, the process backs off slowly from the current and voltage level, to ensure that the device does not overheat.

At block 940, the process determines whether the system has a setting other than full charge. In one embodiment, such settings may be made via an application. For example, in one embodiment, the user may set the device or charger to provide a quick boost, for example to 50% power, after 10 minutes or 75% of power, whichever happens first.

If there is a setting other than a full charge, the process considers charging complete, when the set level is reached.

At block 950, the process determines whether charging is complete. In one embodiment, the process detects that the coupled device is fully charged. In one embodiment, the process detects that the coupled device has reached the setting other than full charge indicated by the user. If not, the process returns to block 925, to continue charging the coupled device. If charging is complete, the process proceeds to block 960.

In one embodiment, at block 960 when there is an available application, the system may send a notification to the user, indicating that the coupled device is fully charged, or charged to the level indicated by the user (e.g. quick charge). In one embodiment, the application resides on the coupled device. In another embodiment, the application resides on a different device, such as a smart watch, computer, or other device that can connect to the coupled device. In one embodiment, the charger system provides additional data to the application, at block 965. In one embodiment, for example, the application may have a dashboard to show how much power was saved by using the charger system. In one embodiment, the application shows an estimate of time until complete charge. In one embodiment, the application provides an estimate, based on an initial evaluation by the charger system, and periodically communicates with the charger system, to update the estimate with real data.

At block 970, in one embodiment, the process utilizes the Bluetooth connection between the charger system and the coupled device to determine whether a forgotten charger alert is needed. A forgotten charger alert is used, if after charging, the charger is left behind, while the coupled device is moved away. If so, at block 975, an alert is sent. In one embodiment, if the charger system interfaces with other devices of the user, in addition to the coupled device, the alert may be provide in connection with any of those devices, and using any of those devices.

At block 980, the process determines whether the user has overridden the alert. In one embodiment, the user may override the forgotten charger alert, on the mobile device, by indicating that the location in question is one where the charger is OK to be left behind (e.g., at home). If the user overrides the alert, in one embodiment, the system uses location data, from GPS, cellular triangulation, or other location information to tag the location, at block 980. The process then ends. In one embodiment, the left-behind alerts may also be made if the user leaves the mobile device behind, but takes the charger system.

Of course, though this process, is shown as a flowchart, it should be understood by one of the skill in the art that the ordering of the actions is not necessarily limited by what is shown. In one embodiment this is implemented as an interrupt-driven system, such that the system continuously monitors proximity and charge level, when appropriate. Additionally, the ordering of the process flow may be different, and many of these steps may take place concurrently. One of skill in the art should understand that the flowchart format is simply used for convenience in this figure.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method of controlling a power supply using software comprising:
   setting a nominal output voltage level as an output voltage through a waveform controlled by a micro-controller;
   identifying when a device is fully charged, and moving to a keep-alive mode, in which the output voltage is decreased below the nominal voltage output level;
   providing a failsafe to move the system to the keep-alive mode when the micro-controller is halted, crashed, or in an error state;
   determining whether the device is disconnected from the power supply;
   in response to determining the device is disconnected from the power supply, reducing the output voltage to a lower keep-alive limit and enabling the micro-controller to go into a sleep state.

2. The method of claim 1, further comprising: overriding a digital enable signal to trigger a standby safety mechanism from the micro-controller, when the output voltage exceeds an upper safety limit threshold.

3. The method of claim 1, further comprising:
   regulating the output voltage at any level between a minimum enforced limit and a maximum enforced limit.

4. The method of claim 3, further comprising: setting the output voltage based on data from the device to be charged, received via a connection with the device to be charged.

5. The method of claim 4, wherein the connection comprises a USB connection.

6. The method of claim 4, wherein the connection comprises a Bluetooth connection.

7. The method of claim 4, further comprising:
   a charger communicating with an application via the connection, wherein the application resides on another device different from the device to be charged.

8. A software controlled power supply comprising:
   a micro-controller to regulate output power of the power supply;
   a mechanism to provide feedback to the micro-controller to determine the amount of power flowing to a coupled device to be charged;
   software in the micro-controller to monitor power flowing to the coupled device; and
   a switch to disconnect the coupled device once the micro-controller has determined that the coupled device is fully charged based on the power flowing to the coupled device; and
   a standby safety mechanism to provide analog clamping of the voltage when the micro-controller is non-functional;
   determining whether the coupled device is disconnected from the power supply;
   in response to determining the coupled device is disconnected from the power supply, reducing the output voltage to a lower keep-alive limit and enabling the micro-controller to go into a sleep state.

9. The software controlled power supply of claim 8, wherein the standby safety mechanism providing power feedback is selected from among: a voltage across a resistive shunt, a voltage across a switch to disconnect the coupled device; and a pulse frequency measurement.

10. The software controlled power supply of claim 8, further comprising: the standby safety mechanism controlled by the micro-controller, the output of the standby safety mechanism used to regulate the power output between an allowed upper limit and an allowed lower limit.

11. The software controlled power supply of claim 8, wherein the standby safety mechanism allows the micro-controller to lock one or more of: an upper safety limit, a lower safety limit.

12. The software controlled power supply of claim 8, wherein the standby safety mechanism automatically locks to a safety limit when the micro-controller stops providing input.

13. The software controlled power supply of claim 8, further comprising: a device attachment detection mechanism to provide attachment status of the coupled device to the micro-controller.

14. The software controlled power supply of claim 8 further comprising: an indication mechanism to indicate a status of the power supply, the indication mechanism comprising one or more of: an illuminated element and an audible alert; and the indication mechanism is provided via one or more of: a wired signal path, a wireless signal path, via an external application, and via an external device.

15. The software controlled power supply of claim 8, further comprising: a state machine to control the power state of the power supply, the power states comprising a low power standby state, and a charging state.

16. The software controlled power supply of claim 15, wherein the power state is influenced by data made available through a connection, and the power state affects one or more of a maximum output power, a maximum charge time, output voltage.

17. A software-controlled power supply comprising:
a micro-controller providing software control;
a feedback network to provide a reference voltage, based on an output voltage of the power supply, the reference voltage provided as an input to the micro-controller;
the micro-controller to compare the reference voltage to a target value, and set a digital enable signal when the reference voltage is below the target value;
a charge pump oscillator controlled by the digital enable signal, the charge pump enabled when the micro-controller determines that the reference voltage is too low, and disabled when the micro-controller determines that the reference voltage is too high, enabling the power supply to be set to any arbitrary voltage level;
a standby safety mechanism to set the power supply to a nominal voltage when the micro-controller is crashed, frozen, or halted, the standby safety mechanism to override the digital enable signal when the output voltage exceeds an upper safety limit.

18. The software-controlled power supply of claim 17, further comprising: a standby safety mechanism is further to override a digital disable signal from the micro-controller when the output voltage falls below a lower keep-alive limit.

19. The software-controlled power supply of claim 17, further comprising: a standby safety mechanism to lock regulation to a lower keep-alive limit when no device is coupled to the power supply, enabling the micro-controller to go into a sleep state.

20. The software-controlled power supply of claim 17, further comprising: a load attachment detector to detect when no device is coupled to the power supply, the load attachment detector to trigger the lock regulation to the lower keep alive limit, to enable the micro-controller to go into a sleep state.

21. The software-controlled power supply of claim 17, further comprising: the micro-controller utilizing a communication mechanism, to communicate with a device for charging, the communication mechanism enabling customizing charging parameters, the parameters being one or more of: output voltage, maximum current, charge time, and charge status.

22. The software-controlled power supply of claim 17, wherein the micro-controller utilizes a charge completion algorithm comprising: a power output measurement yielding a maximum and a minimum power measurement; a timer to determine elapsed time between minimum power measurements; and a metric to establish when the elapsed time between minimum measurements constitutes charge completion.

* * * * *